Feb. 8, 1955          H. G. ENGLISH          2,701,531
HYDRAULIC TORQUE TRANSMITTING DEVICE
Filed April 8, 1953
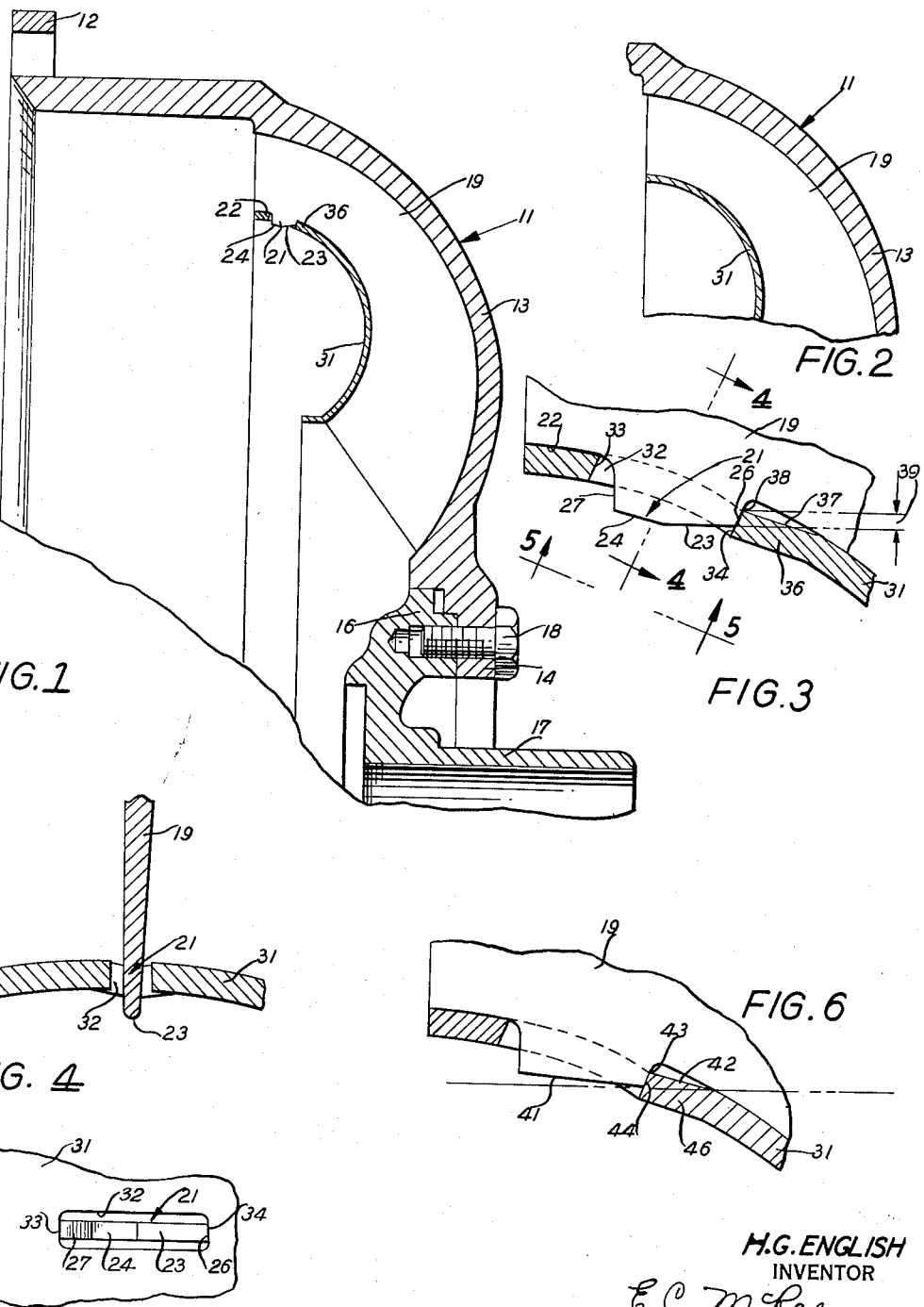
H.G. ENGLISH
INVENTOR
BY E.C. McRae
J.R. Faulkner
G.H. Oster
ATTORNEYS

United States Patent Office 2,701,531
Patented Feb. 8, 1955

2,701,531

HYDRAULIC TORQUE TRANSMITTING DEVICE

Herdis G. English, Birmingham, Mich., assignor to Ford Motor Company, Dearborn, Mich., a corporation of Delaware Application April 8, 1953, Serial No. 347,545

1 Claim. (Cl. 103—115)

This invention relates generally to hydraulic torque transmitting devices, and particularly to the manner of attaching a shroud to the blades of a vaned element of a hydraulic torque transmitting device such as a fluid coupling or a torque converter.

An object of the invention is to provide a hydraulic torque transmitting device in which the inner shroud may be easily and securely attached to the blades of the device with a minimum of time and labor, and in which the co-operating parts may be economically manufactured.

In one form of the invention, the outer shroud and the blades are integrally cast in one piece with integral tabs projecting radially inwardly from the inner marginal edges of certain of the blades. The tabs are formed with generally radially extending shoulders at the ends of the tab adjacent the main portion of the hydraulic torque transmitting device. The inner shroud is formed of sheet metal with a plurality of slots positioned to receive the tabs on the blades. One end of each slot in the shroud is adapted to interlock with the generally radially extending shoulder at the adjacent end of the corresponding tab to prevent disengagement of the shroud from the blades after assembly. To facilitate the assembly of the inner shroud to the tabs on the blades, the portion of the shroud adjacent the said end of each slot is deformed in a radially inward direction to provide an inclined cam surface, and the adjacent edge of each tab has an inclined portion engageable therewith during the assembly of the shroud to the blade. The dimension from the axis of the hydraulic torque transmitting device to the inner marginal edge of each tab is less than the dimension from this axis to the radially outer portion of the end of the corresponding slot in the shroud so that an interference exists which requires deformation of the shroud during assembly and which insures a firm interlocking engagement between the shroud and the blades after the assembly has been completed.

Other objects and advantages of this invention will be made more apparent as this description proceeds, particularly when considered in connection with the accompanying drawings, in which:

Figure 1 is a cross sectional view of the impeller of a torque converter embodying the present invention.

Figure 2 is a cross sectional view similar to a portion of Figure 1 but showing a blade of the device which is not provided with a tab.

Figure 3 is an enlarged cross sectional view of a portion of the construction shown in Figure 1.

Figure 4 is a cross sectional view taken on the plane indicated by the line 4—4 of Figure 3.

Figure 5 is an inside elevational view of a portion of the shroud and tab construction, looking in the direction of the arrows 5—5 of Figure 3.

Figure 6 is a cross sectional view similar to Figure 3 but showing a slight modification.

The present invention is applicable to hydraulic torque transmitting devices such as fluid couplings and torque converters, and to the various vaned elements of such devices, and for the purposes of the illustration is shown here in connection with the impeller of a hydraulic torque converter designed for motor vehicle use. Referring to Figure 1, the impeller 11 is provided with a flange 12 for suitable connection to a driving member, and with an outer shroud portion 13 formed at its radially inner end with a flange 14 adapted to be connected to the adjacent flange 16 of a hub member 17 by means of bolts 18. A plurality of angularly spaced blades 19 are integrally cast in one piece with the outer shroud 13 of the impeller 11.

Certain of the blades 19 of the impeller are formed with tabs 21 integrally cast thereon. Since the outer shroud 13 and the blades 19 are cast in one piece it is only necessary to provide attachment means between an inner shroud and a portion of the blades, and consequently a number of the blades 19 are formed as shown in Figure 2 without tabs.

As best seen in Figures 1 and 3, each tab 21 projects radially inwardly from the inner marginal edge 22 of the blade 19. The inner marginal edge of the tab 21 has an axially extending portion 23 and an inclined portion 24. Shoulders 26 and 27 are formed at opposite ends of the tab 21, and it will be noted that while the shoulder 27 extends substantially radially the opposite shoulder 26 is inclined at a small acute angle to a radial plane.

A sheet metal inner shroud 31 is provided and conforms in shape to the curvature of the inner marginal edges 22 of the blades 19. As seen in Figures 3, 4 and 5, the shroud 31 is formed with a plurality of elongated slots 32, with one slot being provided for each tab 21. The slots 32 are wider than the tabs 21 to accommodate manufacturing variations and to facilitate the assembly of the shroud to the blades. The opposite end walls 33 and 34 of the elongated slot 32 are inclined with respect to a radial plane, the inclination of the end wall 34 being the same as that of the end 26 of the tab 21.

Adjacent the end wall 34 of the slot 32, the shroud 31 is deformed radially inwardly to provide a retaining portion 36, the radially outer surface 37 of which is inclined somewhat, the inclination of the surface 37 being substantially the same as that of the inclined portion 24 of the marginal edge of the tab 21.

As best seen in Figure 4, the radially inner marginal edge portions 23 and 24 of the tab 21 are arcuate in cross section so as to provide a smaller area of contact with the surface 37 of the shroud during the assembly of the shroud to the blades.

It will be noted that the radially outer extremity of the end wall 34 of the elongated slot 32, or in other words the junction 38 between the end wall 34 and the inclined upper surface 37 of the deformed portion 36 of the shroud is spaced radially outwardly a distance 39 from the axially extending portion 23 of the marginal edge of the tab 21. This provides an interference or interlock between the shroud and the tab so as to securely hold the shroud in assembled relationship with the blades after the assembly has been completed.

In the assembly operation the shroud 31 and the integrally cast blade and outer shroud unit are placed in a press, and the shroud 31 is forced axially toward the blades 19. Initially, the inclined portion 24 of the marginal edge of each blade tab 21 is engaged with the correspondingly inclined surface 37 of the deformed portion 36 of the shroud. Continued pressure upon the shroud results in further deformation of the portion 36 of the shroud, deflecting that portion radially inwardly until the radially innermost edge 23 of each tab 21 can be forced over the radially outermost point 38 of the inclined surface 37 of the shroud. Finally, the end 26 of the tab 21 of each blade snaps over the corner 38 of the end wall 34 of the corresponding slot, and the deformed portion 36 of the shroud snaps back to its original position as shown in Figures 1 and 3. In this position the shroud and the tabs interlock, and the inner shroud is permanently assembled to the blades.

In Figure 5 the tab 21 is shown as extending parallel to the sides of the slot 32, but if desired the tab may be inclined with respect to the slot in an axial direction to provide a wedging type engagement.

In order to provide an adequate interlock between the inner shroud and the blades, it is only necessary that a few of the blades be provided with tabs insertable through slots in the shroud. Preferably, these tabs are equally spaced circumferentially of the impeller. Intermediate blades 19 of the impeller, between those provided with tabs, are formed without tabs, as shown in Figure 2 so that the entire marginal edge of the blade engages the adjacent outer surface of the shroud.

The modification shown in Figure 5 differs from that of Figure 2 only in that the radially inner marginal edge 41 of the tab is straight, being uniformly inclined throughout its length with respect to the axis of the impeller. The angle of inclination of the marginal edge 41 of the tab with respect to the axis of the impeller is slightly less than the angle of inclination of the radially outer surface 42 of the adjacent portion of the shroud 31, so that the initial engagement between the marginal edge 41 of the tab and the surface 42 of the shroud is at the radially outer corner 43 of the end wall 44 of the slot. The portion 46 of the shroud deforms gradually until the interlock is completed.

It will be understood that the invention is not to be limited to the exact construction shown and described, but that various changes and modifications may be made without departing from the spirit and scope of the invention, as defined in the appended claim.

What is claimed is:

A vaned wheel for a hydraulic torque transmitting device comprising an outer shroud and a plurality of angularly spaced blades integrally cast as a unit, each of said blades having an arcuate generally axially facing marginal edge formed with a portion near the radially outer part thereof inclined at a small acute angle to the axis of the device, certain of said blades having an integral tab projecting generally radially inwardly from the said inclined portion of the marginal edge of the blade, each of said tabs having a shoulder at its radially inner end and each of said tabs also being formed with a radially inner marginal edge having a generally axial portion adjacent said shoulder and a second portion on the opposite side of said axial portion from said shoulder inclined with respect to the axis of the device in a radially outward direction, and an arcuate sheet metal inner shroud adapted to engage the marginal edges of the blades to provide fluid passageways between said inner and outer shrouds and said blades, said inner shroud having a plurality of elongated slots formed therein corresponding in location and in length to the location and length of the tabs on said blades, each of said elongated slots being slightly wider than the corresponding tabs, the portion of the inner shroud adjacent the radially inner end of each slot in the shroud being bent radially inwardly with respect to adjacent portions of the shroud to form an inclined deformable portion, the radial dimension of the outer surface of said inner shroud immediately adjacent the radially inner end of each slot in said shroud being greater than the radial dimension of the axially extending portion of the radially inner marginal edge of the adjacent tab to require radially inward deformation of the portion of the shroud adjacent the radially inner end of each slot during axial movement of the shroud toward the blades to permit entry of the tabs into the slots and subsequent interlocking engagement between the shoulder formed on each tab and the adjacent radially inner end of the adjacent slot to automatically effect a permanent non-detachable connection between said inner shroud and said blades.

References Cited in the file of this patent

UNITED STATES PATENTS

| 764,452 | Geisenhoner | July 5, 1904 |
| 2,473,185 | Weiss | June 14, 1949 |
| 2,478,306 | Orr | Aug. 9, 1949 |
| 2,639,886 | Townhill et al. | May 26, 1953 |

FOREIGN PATENTS

| 580,119 | Great Britain | Aug. 27, 1946 |